C. FRIEDLUND.
BARK ROSSING DEVICE.
APPLICATION FILED JUNE 8, 1910.

973,494.

Patented Oct. 25, 1910.

Witnesses:
Robert N. Weir
Frederick P. ...

Inventor:
Charles Friedlund
H. Sanders
Atty.

UNITED STATES PATENT OFFICE.

CHARLES FRIEDLUND, OF MOUNTAIN, WISCONSIN.

BARK-ROSSING DEVICE.

973,494.  Specification of Letters Patent.  Patented Oct. 25, 1910.

Application filed June 8, 1910. Serial No. 565,890.

*To all whom it may concern:*

Be it known that I, CHARLES FRIEDLUND, a citizen of the United States, residing at Mountain, in the county of Oconto and State of Wisconsin, have invented certain new and useful Improvements in Bark-Rossing Devices, of which the following is a specification.

This invention relates to bark rossing devices and has for its object to produce a device of the kind that is simple in construction, easy of operation and positive in action.

With this and other objects in view the invention consists in the combination and arrangement of parts to be fully described in the following specification, pointed out in the claim and illustrated in the accompanying drawing, in which—

Figure 1:
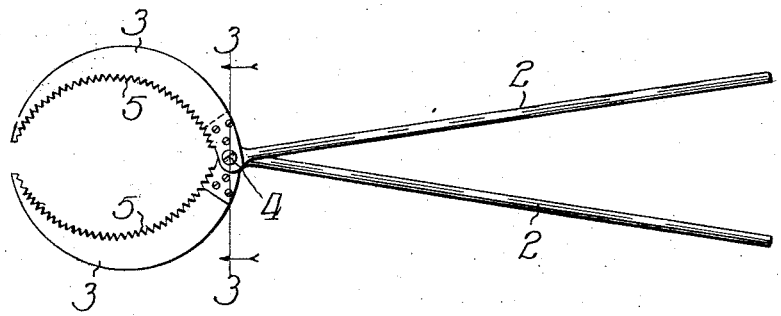
Figure 2:
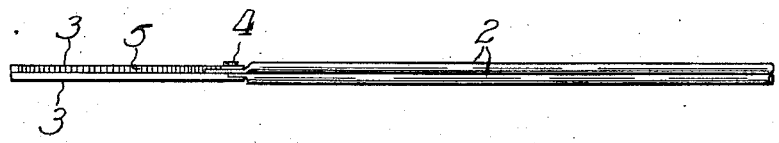
Figure 3:
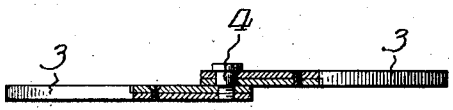

Figure 1 is a front elevation of the device. Fig. 2 is a side elevation with the instrument closed. Fig. 3 is a view partly in section taken on line 3—3 of Fig. 1.

Like reference characters indicate corresponding parts throughout the several views.

2, 2 are the handles which are provided at their front ends with the gripping jaws 3, 3 which are pivoted together as at 4. These jaws are approximately semi-circular in shape and are provided on their relatively inner edges with serrations 5, 5. The jaws lie one upon the other much the same as the blades of a pair of shears and when the handles 2, 2 are drawn together the ends of the jaws overlap. The jaws are shaped and positioned in this manner to permit them to conform to the shape of the trunk of a tree and should the tree be a small one the overlapping feature will permit close conformity to the trunk thereof.

When the jaws are placed about the tree the bark is removed by force applied to both handles in the same direction.

What I claim is:

A bark rossing device consisting of a pair of handles provided at their front ends with a pair of approximately semi-circular serrated jaws pivoted together and adapted to overlap each other when the handles are drawn together.

In testimony that I claim the foregoing as my own I have hereto affixed my signature in the presence of two subscribing witnesses.

CHARLES FRIEDLUND.

Witnesses:
   H. M. BALDWIN,
   OLIVER BALDWIN.